United States Patent
Petrogiannis et al.

(10) Patent No.: US 9,665,737 B2
(45) Date of Patent: May 30, 2017

(54) WEB-BASED METHOD AND SYSTEM FOR APPLYING A LEGALLY ENFORCEABLE SIGNATURE ON AN ELECTRONIC DOCUMENT

(75) Inventors: Tommy Petrogiannis, Montreal (CA); Michael Laurie, Pierrefonds (CA); François Leblanc, Montreal (CA); Benoit Goudreault-Emond, St-Laurent (CA)

(73) Assignee: SILANIS TECHNOLOGY INC., Quebec (CA)

( * ) Notice: Subject to any disclaimer, the term of this patent is extended or adjusted under 35 U.S.C. 154(b) by 573 days.

(21) Appl. No.: 10/022,559

(22) Filed: Dec. 14, 2001

(65) Prior Publication Data

US 2002/0091651 A1 Jul. 11, 2002

Related U.S. Application Data

(60) Provisional application No. 60/255,133, filed on Dec. 14, 2000, provisional application No. 60/291,616, filed on May 18, 2001.

(51) Int. Cl.
G06F 21/30 (2013.01)
G06F 21/64 (2013.01)
G06Q 20/38 (2012.01)

(52) U.S. Cl.
CPC .......... G06F 21/645 (2013.01); G06F 21/30 (2013.01); G06F 21/64 (2013.01); G06Q 20/3821 (2013.01)

(58) Field of Classification Search
CPC ..................................................... G06F 21/30
USPC ............. 380/23–30; 382/115, 232; 709/272; 713/176, 167
See application file for complete search history.

(56) References Cited

U.S. PATENT DOCUMENTS

| | | | | |
|---|---|---|---|---|
| 5,606,609 A | * | 2/1997 | Houser et al. ................ | 713/179 |
| 5,646,997 A | * | 7/1997 | Barton .......................... | 713/176 |
| 5,649,186 A | * | 7/1997 | Ferguson ...................... | 707/10 |
| 5,677,955 A | * | 10/1997 | Doggett et al. ................ | 705/76 |
| 6,085,322 A | * | 7/2000 | Romney et al. .............. | 713/176 |
| 6,091,835 A | * | 7/2000 | Smithies et al. .............. | 382/115 |

(Continued)

FOREIGN PATENT DOCUMENTS

| | | |
|---|---|---|
| JP | 2-171865 | 7/1990 |
| WO | 00/57318 | 9/2000 |

OTHER PUBLICATIONS

Kalla et al., Achieving Non-Repudiation of Web Based Transactions, Oct. 1998, Journal of System Software, pp. 165-175.*

(Continued)

Primary Examiner — William Powers
(74) Attorney, Agent, or Firm — Nyemaster Goode P.C.

(57) ABSTRACT

A web-based method and system for applying a legally enforceable signature of a user on an electronic document. The user accesses a web environment from a secure electronic system having verified his identity. Once in this web environment, the user is presented with a web-based representation of the document, and with legal disclosure and consent information related to the signing process. The user must agree with all of the information presented to him before his signature is applied to the document. A process log of the signing is kept for future reference.

33 Claims, 7 Drawing Sheets

(56) References Cited

U.S. PATENT DOCUMENTS

| | | | | |
|---|---|---|---|---|
| 6,105,012 | A | * | 8/2000 | Chang .................... G06Q 20/00 380/277 |
| 6,151,624 | A | * | 11/2000 | Teare et al. ................... 709/217 |
| 6,367,012 | B1 | * | 4/2002 | Atkinson et al. .............. 713/176 |
| 6,401,206 | B1 | * | 6/2002 | Khan et al. .................... 713/176 |
| 6,959,382 | B1 | * | 10/2005 | Kinnis et al. ................. 713/170 |
| 7,209,571 | B2 | * | 4/2007 | Davis et al. .................. 382/100 |
| 2001/0014839 | A1 | * | 8/2001 | Belanger et al. ............. 700/245 |
| 2002/0002543 | A1 | * | 1/2002 | Spooren et al. ................ 705/57 |

OTHER PUBLICATIONS

Grather et al., Enhancing Workflows by Web Technology, 1997, ACM, pp. 271-280.*

Senn, James A., Expnading the Reach of Electronic Commerce: The Internet EDI Alternative, Jun. 1998, Information Systems Management, pp. 1-9.*

* cited by examiner

FIG. 4

WEB-BASED METHOD AND SYSTEM FOR APPLYING A LEGALLY ENFORCEABLE SIGNATURE ON AN ELECTRONIC DOCUMENT

FIELD OF THE INVENTION

The present invention relates to the electronic signing of documents, and more particularly concerns a web-based process and system allowing the legally enforceable signing of documents in a web environment, which does not require the user to install any special signing software on his system.

BACKGROUND OF THE INVENTION

In the Web e-commerce world, physical handwritten signatures are often considered an unnecessary burden to a process that users expect to be fast, easy, and reliable. An increasing number of businesses are engaged in Web-based e-commerce activities and require the legal signing of contractual documents or records as part of delivering their Web-based services. These types of applications are prevalent in financial services that are affected by the E-Sign law. In this environment, users currently go to the service provider's Web site and are required to download and print documents, physically sign them, and send the signed documents back to the service provider either by Fax or mail. This results in added delays, increased costs, and additional manual processing on the part of the service provider. Web-based service providers or operators of Web sites would prefer to have their customers review and legally sign any required contractual documents or records directly and in real-time on their Web site, where users would only need a Web browser to complete the transaction as quickly as possible.

To understand what "signing" means, one needs to consider the Uniform Commercial Code (UCC) which defines a signature as a mark or symbol of the signer's intention to authenticate a written document. The Electronic signatures in The Global and National Commerce Act (a.k.a. E-Sign law) defines an electronic signature as an electronic sound, symbol, or process, attached to or logically associated with a contract or other record and executed or adopted by a person with the intent to sign the record. Therefore, an electronic signature can be represented by one's name that is typed into a Microsoft Word document or by clicking on an "I Agree" button at the end of a series of Web pages, as long as the act of signing is somehow attached to or associated with the contract or record and with the person who is signing.

Either of these methods would be ideal on the Web. However, without security to protect the attachment or the association of the signature to the document or record that it is authenticating, it will not be considered reliable and the contract would not be legally enforceable. This invention provides the equivalent of a legally-enforceable "I Agree" button or a typed name and signing process that is secured through PKI technology or other means without the complexity of issuing digital certificates to each user who needs to sign and then having to manage all these digital certificates.

To date, having a secure electronic signature meant providing each signer with a unique, secure identifier that was used to sign through cryptographic techniques. Such an approach is difficult to implement and use. The present invention separates the "signing" and security into two separate functions and leverages the fact that Web sites using this invention will be able to create and maintain their own unique identifier for the signer where this unique identifier is used by this invention to electronically sign the document. Security is then applied in a unique manner that is optimized for this Web environment.

SUMMARY OF THE INVENTION

In accordance with a first aspect of the invention, there is provided a web-based method for applying a legally enforceable signature of a user on an electronic, document, the signing of said document occurring in a web environment. The method includes the following steps:
a) having the user access the web environment from a secure electronic system, said secure system having verified the identity of the user;
b) having the user sign the electronic document in said web environment, said signing comprising the substeps of:
  i) presenting the user with a web-based representation of the document;
  ii) presenting the user with legal information related to said signing, and getting agreement from the user of said legal information; and
  iii) upon agreement from the user of the legal information, applying said signature of the user on said document;
c) generating a process log of the signing of step b) and securely associating said process log with the document as signed; and
d) making the document as signed available to the user.

In accordance with another aspect of the invention, there is provided another web-based method for applying a legally enforceable signature of a user on an electronic document. The signing of said document occurs in a web environment, and the method includes the steps of:
a) having the user access the web environment from a secure electronic system, said secure system having verified an identity of the user;
b) having the user sign the electronic document in said web environment, said signing comprising the substeps of:
  i) presenting the user with legal information related to said signing, and getting agreement from the user of said legal information;
  ii) presenting the user with a web-based representation of the document;
  iii) getting confirmation from the user that the document is to be signed; and
  iv) applying said signature of the user on said document;
c) generating a process log of the signing of step b) and securely associating said process log with the document as signed; and
d) making the document as signed available to the user.

According to yet another aspect of the invention, there is provided a system for applying a legally enforceable signature of a user on an electronic document in a web environment.

The system first includes accessing means for accessing the web environment from a secure electronic system.

The system according to this aspect of the invention also includes a plurality of modules. A document-rendering module is provided for presenting the user with a web-based representation of the document. Also provided is a legal disclosure module for presenting the user, in the web environment, with legal information related to electronically signing the document, and for obtaining agreement from the user of this legal information. A document approval module for providing the signature of the user to the document, upon agreement from the user of the legal information, is also provided. The system further includes a process log module for generating a process log of the signing of the document and securely associating this process log with the document as signed. Finally, a document distribution module for making the document as signed available to the user is also provided.

Other features and advantages of the present invention will be better understood upon reading of preferred embodiments thereof, with reference to the appended drawings.

DESCRIPTION OF PREFERRED
EMBODIMENTS OF THE INVENTION

The present invention is a new and unique concept in the implementation of electronic signatures over the World Wide Web. It addresses such a need where users can sign legally enforceable documents and records on the Web using only a Web browser. Therefore, the process of "signing" is preferably aligned with the purpose and structure of the service provider's Web site. No components are required to be installed or setup on the user's desktop and all user interactions and the required signatures occur within the Web browser. The term "document" is used herein in a very broad sense and can be a traditional electronic document (e.g. Microsoft Word or Excel, Adobe P D F, etc.) an HTML or XML page or form, a template and associated data elements, a scanned image of a paper document, etc. The document to be signed may be viewed in a browser, but is likely to begin and/or end in a traditional format such as MS Word or Adobe Acrobat, as well as Web-based formats such as HTML and XML. User identification is assumed to come from the service provider's Web site or through an ancillary Web service used by the service provider. This ensures that the service provider or operator of the Web site has properly identified the user to its satisfaction and access to the Web site is then considered secure.

Figure 1:
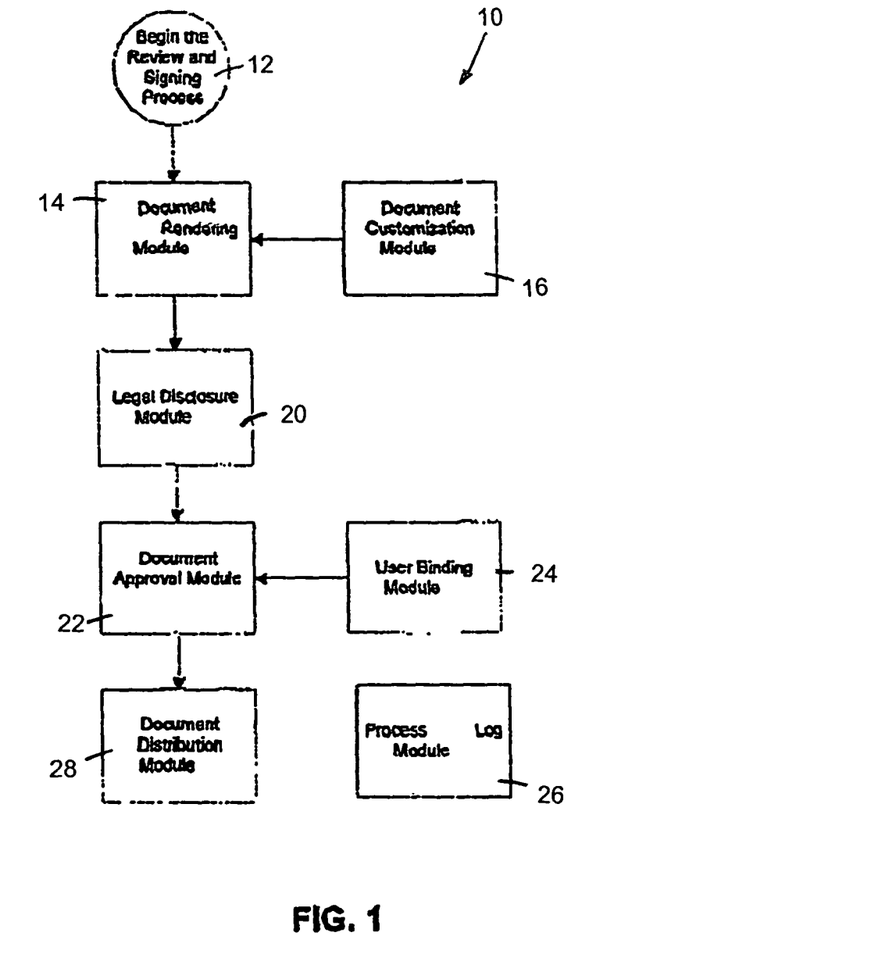
FIG. 1 is a flow chart illustrating the interactions between some of the key modules that are part of a system according to a preferred embodiment of the invention.

Referring to FIG. 1, there is shown a system 10 for applying a legally enforceable signature of a user on an electronic document in a web environment, according to a first preferred embodiment of the present invention. This system 10 preferably consists of a set of modules that can be used in various combinations depending on the application that is running on the eCommerce Server of the service provider's Web site. One of the key advantages of the present system is that it is entirely server-based and it requires only a Web browser to be used on the end-user's desktop.

The system 10 first includes accessing means for accessing the web environment from a secure electronic system, such as a link 12 to this web environment. For example, the user may simply log onto a Web site where she is a member and stores information that is unique about her within the context of that Web site (e.g. an account number). This web site therefore defines the secure electronic system. Once within the Web site, the user needs to sign a document, and simply click on a link that leads to the web environment of the invention. This web environment could physically be a part of the secure electronic system, or remotely connected thereto by a secure connection. In another preferred embodiment, the user's Internet service provider itself could define the secure electronic system. It is therefore assumed that the eCommerce Server at the service provider's Web site where the electronic signing takes place has already identified the signer to its satisfaction. This may be accomplished by a variety of methods including the fact that the signer has been carrying out other transactions from this Web site and is verified by the service provider to in fact be that person.

A document-rendering module 14 for presenting the user with a web-based representation of said document is also provided. This module allows the Web site to automatically prepare a document to present to the user through the Web browser. The Web site may need to retrieve the prepared document from a document storing location through appropriate retrieving means, or it creates the document on the fly using templates. A Document Customization Module 16, cooperating with the document-rendering module, is preferably provided for this purpose. Preferably, the Document rendering Module 14 prepares the document in HTML format or other format so that it may be presented to the user through his Web browser. Any appropriate means to transform the document from a non-web format to such a web format may therefore be provided as part of the document-rendering module. As a result, the user is able to easily review the document prior to signing it. The document-rendering module preferably provides a "Sign" button at the proper location in the document, so that clicking thereon may begin the signing process.

The system 10 of the present invention also includes a legal disclosure module 20 for presenting the user, within the web environment, with legal information related to electronically signing of the document, and for obtaining agreement from the user of this legal information. Preferably, appropriate displaying means are used to display the legal information in a web-based medium, such as a series of Web pages or dialog boxes. The legal information aims to clearly notify the user of the signing that is about to take place and its purposes The legal information preferably includes information about legal implications of using the ongoing process to electronically sign the document, or legal disclosures related to the document itself. The disclosure information also preferably indicates what data or process is being used to create the electronic signature. These pages may also provide all legal disclosures and consent information that is required by the E-Sign or other legislation or regulation. The user is not allowed to proceed with the actual electronic signing of the document unless he has agreed to all the legal information, by clicking on "I Agree" buttons or equivalents. Each element of the legal information may be agreed to individually or as a group. Legal intent is therefore properly established and consented to through these disclosure pages.

The system according to the present invention further includes a document approval module 22, for actually applying the signature of the user on the document upon agreement from the user of the legal disclosure and consent information. To perform the signing, a special signature file is preferably used. In the preferred embodiment, a special signature file is automatically created by a User Binding Module 24, using relevant data that is obtained from the secure electronic system. This data includes user-specific information uniquely identifying the user who is signing, and is preferably combined with the digital certificate and private key of the service provider's eCommerce Server that is controlling the signing process. This user-specific information in the signature file can also include a captured electronic image of the user's signature. Preferably, the document approval module embeds this signature file in the document, thereby effecting its signing.

Also provided in the system 10 of the invention is a process log module 26 for generating a process log of the signing, securely associated to the document as signed. In the preferred embodiment, the process log module 26 captures a record of every step of the signing process, and therefore further reduces the possibility of fraud. All the operation of the legal disclosure module and document approval module should in the minimum be included in this process, although during the course of the process leading up to and after the electronic signing, most if riot all of the events in the process should preferably be recorded or observed such that at a later time they serve to support the act of signing. The process log can then be used to reconstruct every Web page and step that occurred during the signing process, for future reference.

By stating that the process log is "securely associated to the document", it is meant that measures are taken to ensure that the log is the true rendition of the signing of a particular document. In the preferred embodiment, a secure process authentication code uniquely representing the process log is embedded in the document as signed. For example, the secure process authentication code is embodied by a hash of the process log. Advantageously, this embodiment ensures that any tampering with the process log after the signing of the document would be immediately detectable when accessing this log by comparing a hash of the log accessed with the one provided in the signed document. The process log and secure process authentication code are also preferably stored in a database, on the present system or located elsewhere, for future reference. Similarly, to prevent tampering of the document after its signing, a secure document authentication code uniquely representing the document as signed, such as a hash of this document, is also embedded therein. This secure document authentication code is also stored on the system database to ensure that the process log also has the secure document authentication code.

A Document Distribution Module 28 is finally provided for distributing the electronically signed document or record to the user, and any other party involved in the signing. This will enable each party to have an identical signed copy that can be used to avoid possible fraud in the future. This feature is advantageous in that when one signs a legally-enforceable document or record, this binding exists between two or more parties and each party should ideally receive a copy of the signed document or record within a reasonable period after the completion of the signing process such that they remember or can verify that the contract (i.e. the electronically signed document or record) is what they have actually signed. This is effectively what happens today on paper.

It is understood that the above description of the present system's constituent modules is provided at a high-level to assist in the understanding of the structure of this invention. Each of these modules actually consists of many sub-components that are beyond the scope of this document due to their complexity. These sub-components include many optional capabilities such as a document store, a user password recovery mechanism, digital time stamping facility, and a digital notary.

Figure 3:
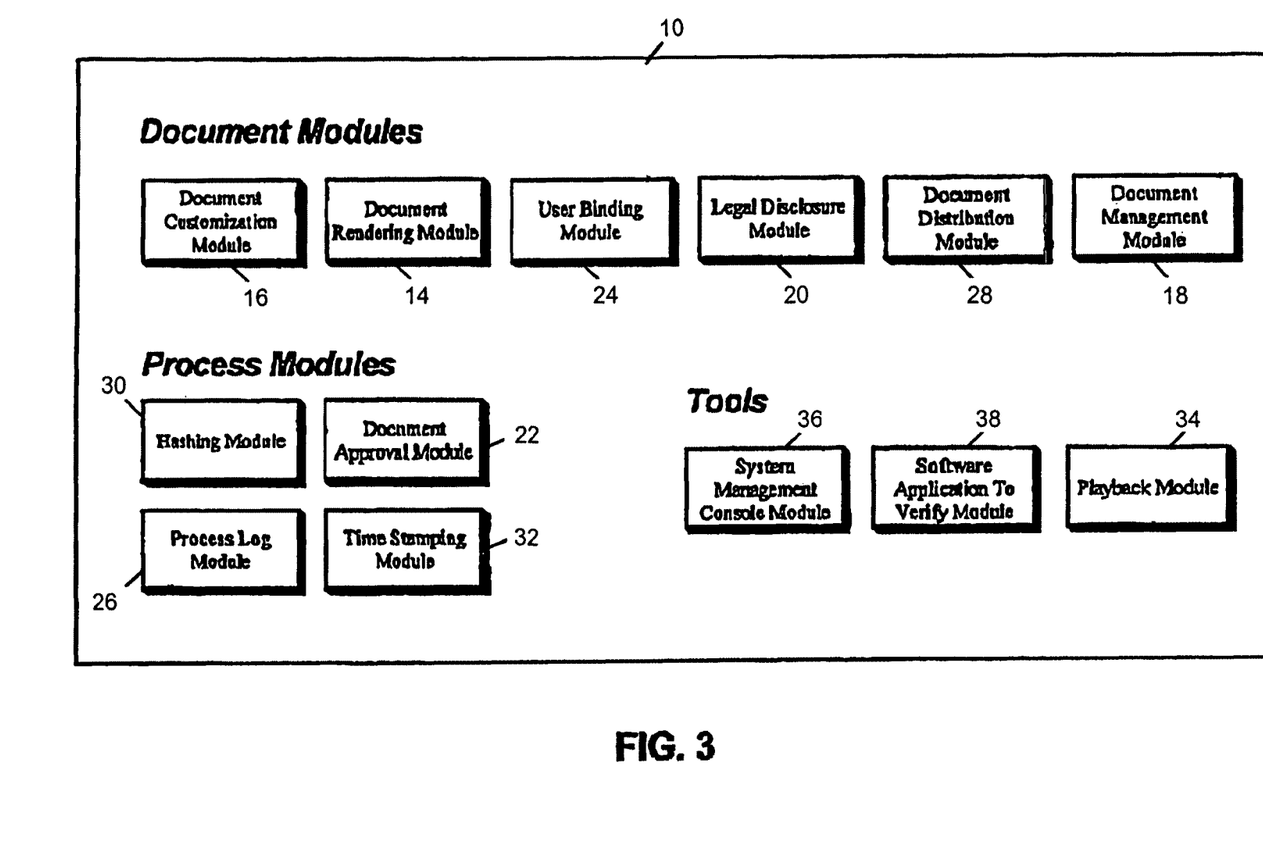
FIG. 3 illustrates various modules according to an embodiment of the invention more elaborate than the embodiment of FIG. 1.

Referring to FIG. 3, there are shown a few additional modules that may for example be added to the system 10 of the present invention. "Document Modules" may include a document management module 18 in addition to the document customization module 16, the document-rendering module 14, the user binding module 24 and the document distribution module 28. The "Process Modules" include the above-described process log module 26, the document approval module 22, and additionally a hashing module 30, and a time stamping module 32. Tools such as a playback module 34, a system management console module 36 or a software application to verify the document 38 may also be included. Other optional modules not shown in FIG. 3 include the following: identity management module, reporting module, billing module, archival module, template creation & validation module, policy manager module, and upload module.

In accordance with another aspect of the present invention, there is also provided a web-based method for applying a legally enforceable signature of a user on an electronic document, the signing of this document occurring in a web environment. The method includes the following steps:

a) having the user access the web environment from a secure electronic system, this secure system having verified the identity of the user;

b) having the user sign the electronic document in the web environment. The signing includes the following sub-steps:

i) presenting the user with a web-based representation of the document. The document may be retrieved from a document storing location or generated from a template. If the document is originally in a non-web format, it is preferably transformed into a web-compatible format;

ii) presenting the user with legal information related to the signing operation, preferably through a series of web pages or dialog boxes. The user must agree to this legal disclosure and consent information to move on to the next step;

iii) upon agreement from the user of the legal information, applying the signature of the user on said document. Preferably, user-specific information is obtained from the secure electronic system and included in a special signature file, defining the electronic signature of the user that may include a captured electronic image of the signer's signature. The user specific information preferably includes a digital certificate and private key of the electronic system on which the signing process is being executed which are also associated to the document; and c) generating a process log of the signing operation, and securely associating this process log with the document. Ideally, this process log allows the reconstruction of at least substeps b) i) to b) iii) above as executed by the user. In the preferred embodiment, a secure process authentication code such as a hash of the process log is generated and embedded in the document as signed. Both the secure process authentication code and process log itself are also preferably stored in a log database for future reference.

d) making the document as signed available to the user and any other parties concerned by said document. It may for example be e-mailed or otherwise transmitted to him, or sent to a download page accessible by all involved.

Preferably, an additional step of providing an audit trail of the signing process inside the document is performed. Another possible additional step includes providing a secure document authentication code in the document, such as a hash thereof after signing. The secure document authentication code is also preferably stored in a database such as the log database.

It is understood that the particular order in which the steps and substeps of the method above are performed is not material to the invention. For example, the legal disclosure and consent information may be presented to the user before the electronic document itself. Any number of other immaterial modifications to the sequential order of the present method may equally be made.

Referring to FIGS. 2A to 2D, there is illustrated a more detailed embodiment of the method of the present invention identifying the different components of a system that may be used to perform this method.

Figure 2A:
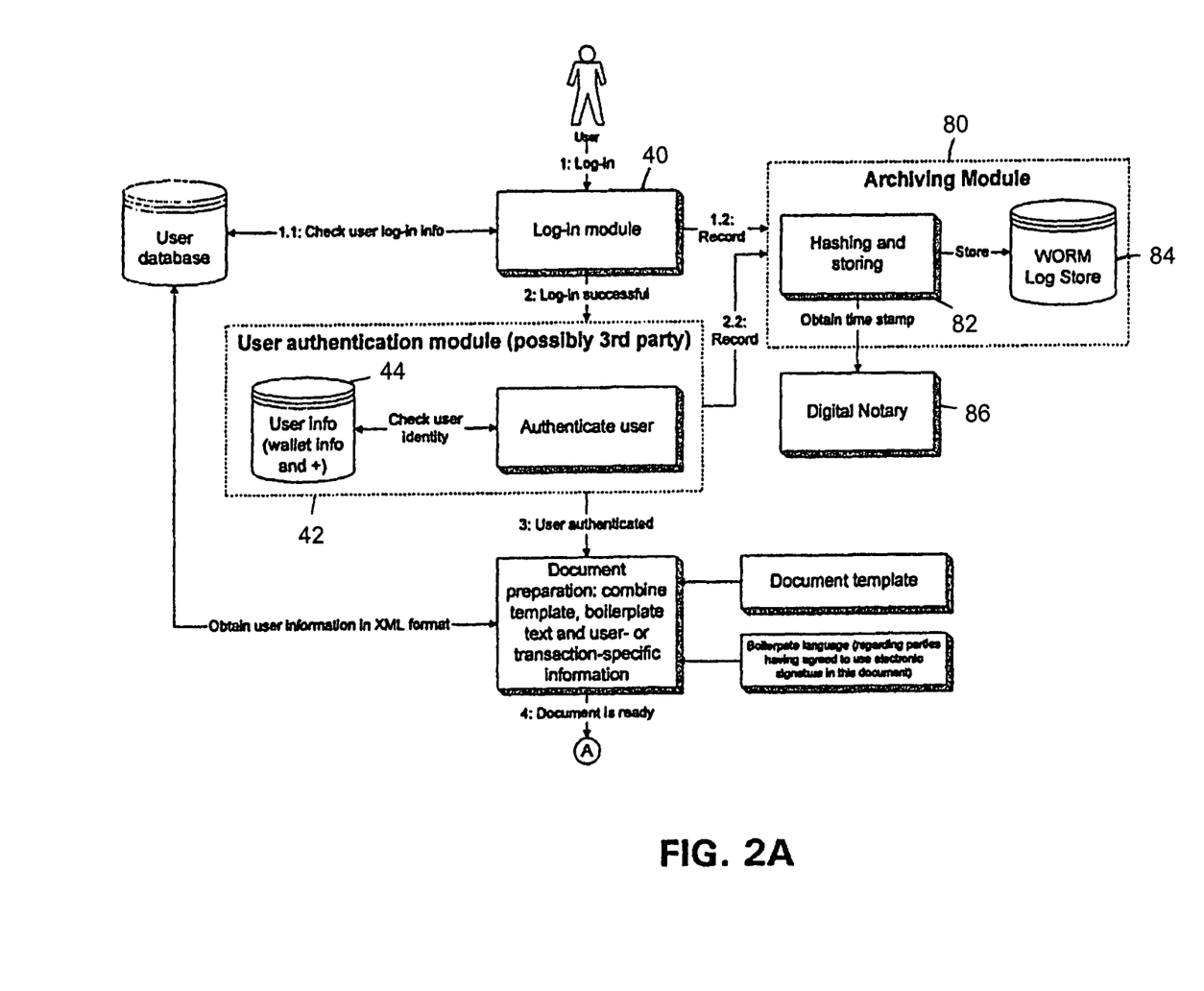
FIGS. 2A to 2D define together the flow chart of a method according to a preferred embodiment of the invention.

Referring to FIG. 2A, there is first illustrated the log in process of the user accessing the system. A log-in module 40 is provided, ensuring a successful login of the user. The identity of the user is then checked through a user authentication module 42. User specific information 44 is available for this purpose. The document is then prepared using templates, boilerplate text or user-specific information 44 obtained from the system to which the user is logged on.

Figure 2B:
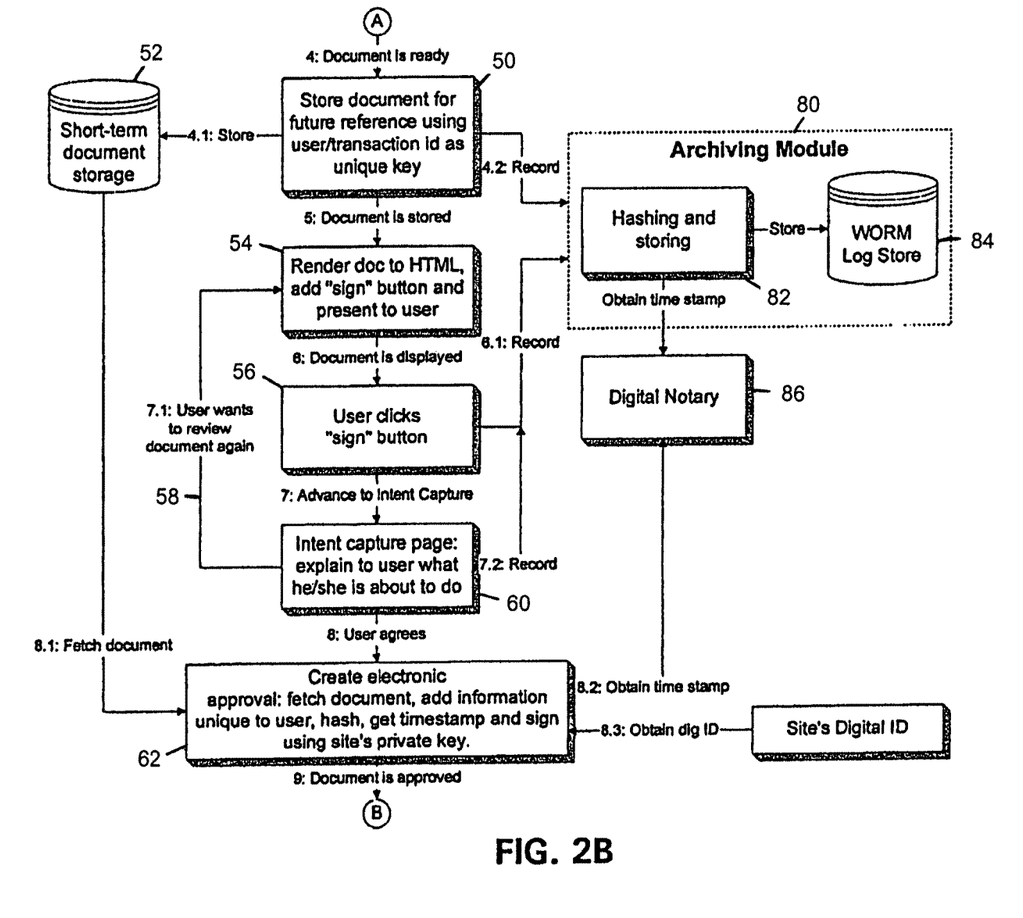

Referring to FIG. 2B, there is shown how the document, once ready, is preferably stored 50 in short-term document storage 52 for future reference. A copy of the document is rendered to HTML 54 or any other method used by the Web browser to which a "sign" button is added at an appropriate location. In this embodiment, the user first clicks on the sign button 56 and is then taken to the legal disclosure and consent page or pages where the legal intent of the user is confirmed 60. The user may at this point go back 58 to the Web browser rendition of the document 54 to review its content again, if so desired. Once the user has agreed to all legal implications of the signing process, the actual approved document is created 62. The document is fetched from short-term storage 52, the unique information about the user representing his signature is attached thereto, and the document is preferably hashed, timestamped and signed using the system's private key.

Figure 2C:
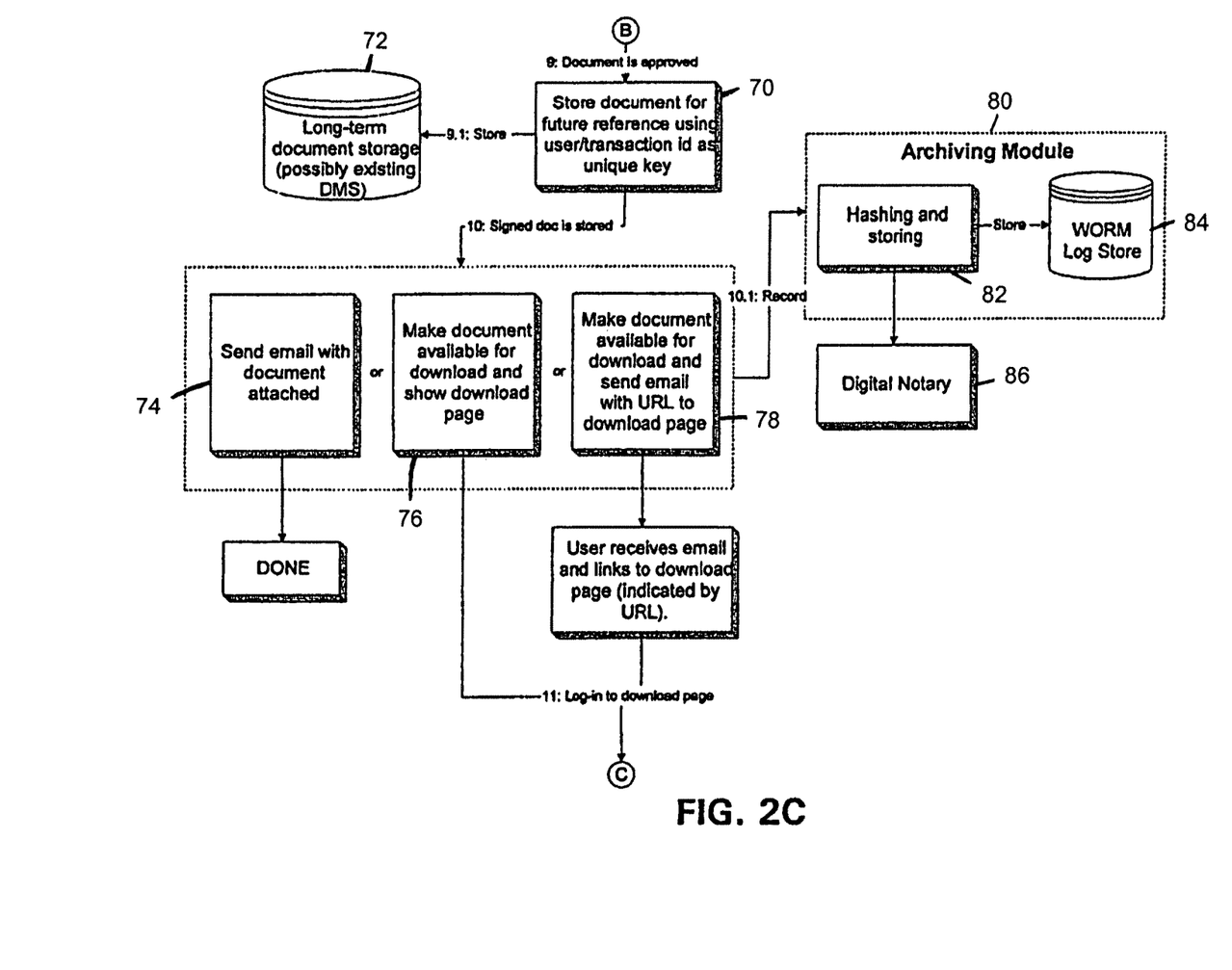

Referring to FIG. 2C, there is shown that the signed document is stored 70 in long-term storage 72 for future reference using the user's transaction id as unique key. From there, several options are possible. The document may be e-mailed 74 to the user and any other interested party. It may be available for download 76 and the user is automatically taken to the download page. Alternatively, an URL to the download page may be e-mailed 78 to the user.

Figure 2D:
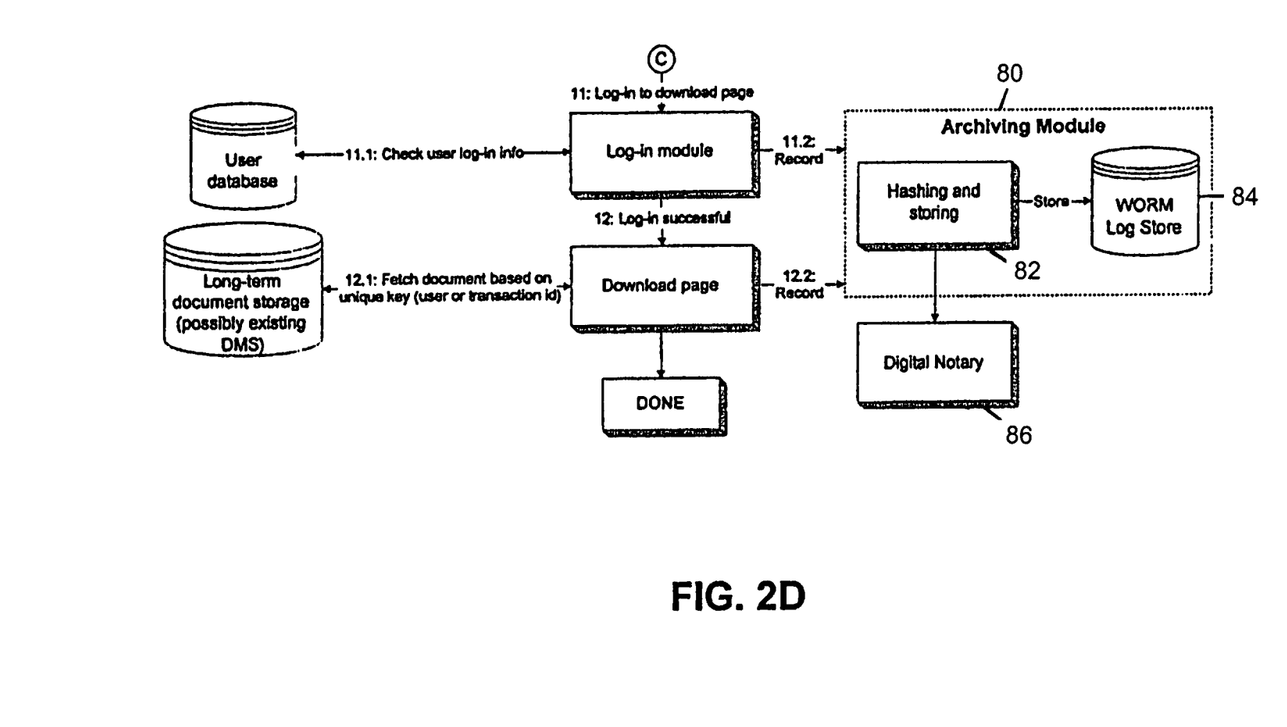

FIG. 2D illustrates the download process.

At each step of the method above, an archiving module 80 keeps a record of the entire process. Preferably, this information is hashed 82 and stored in a WORM log store 84. A digital notary 86 provides a time stamp for each event.

It is understood that the embodiment of FIGS. 2A to 2D is given as an example and is in no way limitative to the scope of the present invention.

Figure 4:
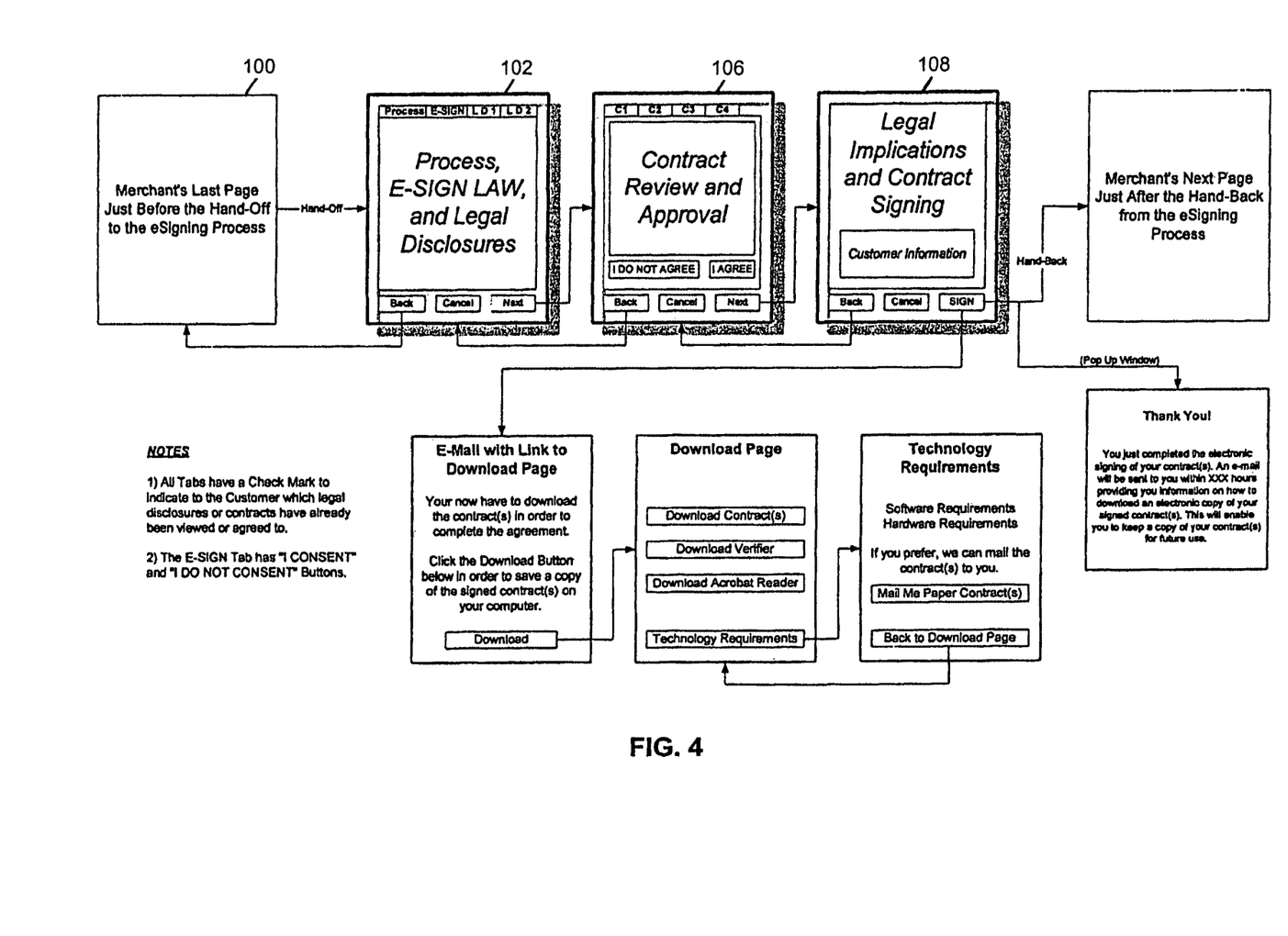
FIG. 4 illustrates a preferred embodiment of the invention put into practice.

Referring to FIG. 4, there is generally illustrated how the method and system of the present invention would for example appear to a user thereof At step 100, the user accesses the merchant's last page just before the hand-off to the e-Signing process. Then step 102 informs the user about the processes in-use to create the electronic signature and provides him with the required legal disclosures. At step 106, the contract is reviewed and approved. The last key step 108 of the e-Signing process presents to the user the legal implications of proceeding with the electronically signing of these contracts. Other representations are possible.

The Web-Based e-Signing Process is used here in the context of a merchant's e-Commerce Web site where an electronic approval and signature is required to complete a specific commercial transaction on the Web. Once a customer has completed the execution of a particular e-Commerce transaction or process and is ready to electronically sign a legally enforceable contract, the merchant's e-Commerce Web site performs a hand-off to the e-Signing Process and provides all pertinent data and information needed to generate the appropriate contract for approval and signature. Once this hand-off is complete, the customer is guided through three major steps that represent the core e-Signing Process.

1. Process, E-SIGN Law, and Legal Disclosures

The e-Signing process starts by clearly explaining the electronic signing process that the customer is about to execute, providing a brief overview of the E-SIGN law, and displaying the legal disclosures and consent information required for that particular transaction or contract(s). The presentation method depicted in FIG. 4 is based on the use of tabs where each tab represents one of the following elements;

The Process tab explains the e-Signing process.

The E-SIGN Law tab provides a brief overview of the E-SIGN law with hyperlinks to other relevant information. This tab also has "I CONSENT" and "I DO NOT CONSENT" buttons to capture the customer's consent as required by the E-SIGN law.

The Legal Disclosures tab presents all the required legal disclosures and consent information (LD1, LD2, etc.). An unlimited number of disclosures can be accommodated.

All tabs have a check mark to indicate to the customer which legal disclosures and consent information have already been viewed or agreed to.

It should be noted that the choice of tabs in this figure represents one implementation method that is used here to illustrate the invention. Other methods are also possible and will not impact the scope, applicability, or innovative nature of this invention.

2. Contract Review and Approval

After reviewing all the information provided in step 1, the customer proceeds to the next step where the contracts are reviewed and approved. An unlimited number of contracts can be presented (C1, C2, C3, C4, etc.). After reviewing each contract, the customer can either agree or disagree to the terms and conditions of a particular contract. As before, all tabs have a check mark to indicate to the customer which legal disclosures and consent information have already been agreed or disagreed to.

3. Legal Implications and Contract Signing

The last key step of the e-Signing process presents to the customer the legal implications of proceeding with the electronically signing of these contracts. This step also presents all customer information necessary to explain the legal implications in the context of the executed transaction. It is this information that will be used to electronically sign the contracts and bind the customer to these contracts based on a secure, tamper-proof, and non-refutable method as described above. Once the customer has signed the contracts, control returns to the merchant's e-Commerce Web site based on a pre-defined hand-back protocol, which transfers status data indicating which contracts were successfully signed and which were not.

In parallel with the hand-back transfer of control to the merchant's e-Commerce Web site, the e-Signing Process provides the following:

Thanks customers for using the e-Signing process and informs them that an e-mail will be sent to them, enabling them to download a copy of the signed contracts for their records;

Sends an e-mail to the customer with a link to the Download Page. The Download Page enables customers to download a copy of the signed contracts to be stored on their computers or printed. This page also provides customers with the ability to download a software application for verifying the authenticity of the signed contracts. Customers will also be provided with information on the technology requirements, both software and hardware, needed to view and print the downloaded contracts.

Upon viewing the technology requirements, customers will still have the option to request paper copies of the contracts should they decide to do so instead of proceeding with electronic contracts.

The uses and advantages of the present invention are not limited to the embodiments described above. As further examples, the three following scenarios are considered for using the invention:

1. Signing of a document by a new member enrolling to the eCommerce Server of the service provider's Web site In this case, the user is new to the service provider's Web site and will need to sign a document as part of the enrolment to the site or to obtain a service from the site. For example, an online mortgage company receives an application from a new customer. The new customer needs to provide information that will be used to identify himself. The new customer must then go through some kind of online identification process so that the online mortgage company can be certain that it will not be defrauded. If the service is successful, then the new customer proceeds with the signing process using the esigning Server. It is possible that the service provider chooses to post-identify the new customer. That is, the identity of the new customer is assumed until some later event takes place such as submitting a check for payment that will serve to identify this customer. This approach is not likely to work for all processes since it may not be possible to wait for such an event.

2. Signing of a document by an existing member of the eCommerce Server of the service provider's Web site Using the online brokerage Web site example, an existing member of the site needs to sign some authorization documents. Since the trader is a known member of the Web site, available identification information can be used for the purpose of signing. The trader's ability to log in gives them the right to sign. Signing can then proceed as described above with the full knowledge that the user has already been securely and positively identified.

3. Signing of a document on a related Web site by an existing member of the eCommerce Server of the service provider's Web site In this case, an existing member of a Web site must sign documents at a related, linked Web site. For example, an online banking site offers insurance to its existing members through a link from its eCommerce Server. When the member is linked to the insurance company's Web site, this member is "introduced" to the insurance Web site by the online banking Web site. The insurance Web site may then accept the identity of the online banking member without further verification and the member is now able to sign documents on its Web site using the process described above. In this case, this invention provides a capability through the eSigning Server to securely transfer the identity of the existing member to the related Web site. It is also possible for the eSigning Server of the online banking Web site to allow its members to sign an insurance company's documents on its Web site without the need to transfer the member and associated identity to the insurance company's Web site.

Business applications for this present invention are numerous in the financial services area as well as other service providers or businesses requiring the legal signing of contractual documents controlled through their Web sites. In the financial services area, applications include insurance applications, insurance claims, securities transaction authorizations, mortgages, loans, leases, banking authorizations, and many other types of documents that require legally enforceable signatures. Outside of financial services, applications include general business contracts, non-disclosure agreements, proposals, bids, and response to RFPs. An example of a typical application would be an online brokerage Web site where members are required to sign authorization documents to allow for the transfer of funds or for opening new mutual fund accounts. In order to maintain control over these Web-based documents, they would generally be maintained at the Web site of the brokerage firm. Since these documents need to be signed, the service provider or Web site operator cannot burden the users by requiring the creation of special signatures or the installation of special software on their desktops in order to identify themselves for the purpose of electronically signing such documents.

In addition to the applicability of this invention to the signing of Web-based, legally-enforceable documents in various industries (e.g. financial, pharmaceutical, government, legal, engineering, manufacturing, etc.), other possible uses for this invention include Web-based marketing, content source insurance, self-branding, cross-branding, syndication, digital rights protection, personalization, collaboration, gaming, and a wide range of emerging distributed or peer-to-peer applications, to name a few.

In summary, this invention replaces a regular "I Agree" button or a typed name in Web pages by a process containing one or more "I Agree" buttons where that process sufficiently demonstrates the signer's intent during the electronic signing process. Of course, the expression "I Agree" is given here by way of example as any other appropriate formulation could laternatively be used. The invention is also compatible with the capture of the signer's signature as an electronic image to be applied to the signed document. Furthermore, this invention also provides for the collection and securing of digital data as electronic evidence such that the secure signing process and the securely signed document may be considered legally enforceable or legally binding.

Of course, numerous changes and modifications may be made to the embodiments described above without departing from the scope of the invention as defined in the appended claims.

What is claimed is:

1. A secure, tamper evident and non-refutable web-based method for applying a legally enforceable signature of a user on an electronic document located on a server, signing of said document occurring in a web environment, said method being entirely server based, not requiring installation of any interface program for signing documents on the user's computer and comprising the steps:

a) having the user access, through a web browser, the web environment of a web-based service provider's secure electronic system, said secure electronic system of the web provider or an ancillary service used by the web provider having verified an identity of the user, wherein upon the user being ready to electronically sign the electronic document, the web-based service provider's system performs a hand-off to the signing process;

b) having the user sign the electronic document in said web environment through presentation of web pages to said user through the user's web browser, said signing including the server controlling the signing process, said signing further comprising utilization of modules on the server performing the substeps of:

i) presenting the user with legal information related to said signing, and with a web-based representation of the electronic document in said web browser through at least one of said web pages;

ii) getting agreement to said legal information in said web browser and instructions to apply a signature to the document from said user through one or more browser-implemented features provided on at least one of said web pages;

iii) applying said signature of the user on said document on the server; and iv) notifying the user of the signing of the document, through at least one of said web pages;

c) on the server, generating a process log which is securely associated with the electronic document being signed, wherein the process log is a true rendition of the signing of the electronic document, and in the signing of step b), said process log comprising a record of the signing process of substeps b) i) to b) iv) as executed, said record storing every one of said web pages as presented to the user for reproduction at a later date, and securely associating said process log with the document as signed, wherein the process log evidences the signing of step b) without directly interacting with a user's computer due to the method being server-based;

d) making the document as signed available to the user; and wherein the securely associating of step c) comprises the substeps of:

i) generating a secure process authentication code uniquely representing said process log;

ii) embedding said secure process authentication code in said document as signed, thereby securely associating said process log and said signed document; and wherein said process authentication code is a hash of said process log;

wherein all interactions with the user during the signing process occur in the web browser through the web pages such that legal intent to sign and agreement to the contents displayed on the Web pages is established and consented to through the viewing of said web pages, the storing of every one of said web pages in the process log allowing reconstruction of every step that occurred during the signing process.

2. The method according to claim 1, wherein the presenting a web-based representation of the document of substep b) i) comprises retrieving said document from a document storing location.

3. The method according to claim 1, wherein the presenting a web-based representation of the document of substep b) i) comprises generating said document from a template.

4. The method according to claim 1, wherein the presenting a web-based representation of the document of substep b) i) comprises transforming said document from a non-web format to a web-format.

5. The method according to claim 1, wherein, in step b) i), said legal information presented to the user comprises information about legal implications of the signing of the document.

6. The method according to claim 1, wherein, in step b) i), said legal information presented to the user comprises legal disclosures related to said document.

7. The method according to claim 1, wherein the applying said signature of substep b) iii) comprises associating user-specific information to said document.

8. The method according to claim 7, wherein, in substep b) iii), said user-specific information is included in a special signature file defining the signature of the user.

9. The method according to claim 7, wherein the applying said signature of substep b) iii) further comprises associating a digital certificate and private key to the document.

10. The method according to claim 7, wherein the applying said signature of substep b) iii) further comprises obtaining said user-specific information from the secure electronic system.

11. The method according to claim 7, wherein step c) comprises storing the process log in a log database.

12. The method according to claim 1, comprising an additional step before step d) of providing an audit trail of the signing of step b) in the document as signed.

13. The method according to claim 12, wherein said additional step comprises including a secure document authentication code uniquely representing said document as signed in said audit trail.

14. The method according to claim 13, wherein said additional step further comprises storing said secure document authentication code in a database.

15. The method according to claim 13, wherein said additional step further comprises generating a hash of said document as signed defining the document authentication code.

16. The method according to claim 1, comprising an additional step before step d) of embedding a secure document authentication code uniquely representing the document as signed inside said document.

17. The method according to claim 1, wherein step d) comprises transmitting a copy of the document as signed to the user.

18. The method according to claim 1, wherein step d) comprises enabling the user to download the document as signed.

19. The method according to claim 1, wherein step d) further comprises making the document as signed available to at least one additional party concerned by said electronic document.

20. A secure, tamper evident and non-refutable entirely server-based system for applying a legally enforceable signature of a user on an electronic document located on a server, signing of said document occurring in a web environment through presentation of web pages to said user and not requiring installation of any interface program for signing documents on a user's computer, said system comprising:

accessing means for the user accessing said web environment of a web-based service provider's secure electronic system through a web browser, said secure electronic system of the web provider or an ancillary service used by the web provider having verified an identity of the user;

wherein upon the user being ready to electronically sign the electronic document, the web-based service provider's system performs a hand-off to a signing process;

a document-rendering module on the server for presenting the user with a web-based representation of said electronic document in said web browser;

a legal disclosure module for presenting the user, in said web environment, with legal information related to electronically signing said electronic document, and for obtaining agreement from the user of said legal information related to the electronic signing, wherein the electronic document is provided to the user through presentation of web pages to the user through the user's web browser, including interacting with the user solely through the web browser;

a document approval module for providing the electronic signature of the user to the electronic document upon agreement from the user of the legal information, thereby signing said electronic document;

a process log module for generating at the server of the web-based service provider, a process log of the signing of the electronic document and securely associating said process log with the document as signed, wherein the process log is a true rendition of the signing of the electronic document, said process log comprising a record storing, for reproduction at a later date, every one of the web pages presented to the user during the signing of the electronic document, demonstrating execution of at least the steps of:

i) presenting the user with the legal information related to said signing and with the web-based representation of the electronic document, through at least one of said web pages;

ii) getting agreement from the user to said legal information and instructions to apply a signature to the document from said user through one or more browser-implemented features provided on at least one of said web pages;

iii) notifying the user of the signing of the electronic document, through at least one of said web pages; and a document distribution module for making the document as signed available to the user;

wherein the process log evidences the signing of the document without directly interacting with a user's computer; and said process log module comprising means for generating a secure process authentication code uniquely representing said process log, the secure process authentication code comprising a hash of the process log, and said process authentication code being embedded in said document as signed in order to securely associate said process log and said electronic document; wherein all interactions with the user during the signing process occur in the web browser through the web pages such that legal intent to sign and agreement to the contents displayed on the Web pages is established and consented to through the viewing of said web pages, the storing of every one of said web pages in the process log allowing reconstruction of every step that occurred during the signing process.

21. The system according to claim 20, wherein said document-rendering module comprises retrieving means for retrieving said document from a document storing location.

22. The system according to claim 20, further comprising a document customization module cooperating with the document-rendering module for generating said document from a template.

23. The system according to claim 20, wherein said document-rendering module comprises transforming means for transforming said document from a non-web format to a web-format.

24. The system according to claim 20, wherein said legal information comprises information about legal implications of the signing of the document.

25. The system according to claim 20, wherein said legal information comprises legal disclosures related to said document.

26. The system according to claim 20, further comprising a user binding module cooperating with the secure electronic system to obtain therefrom user-specific information, generating a special signature file using said user-specific information and providing said special signature file to the document approval module, said special signature file defining the signature of the user.

27. The system according to claim 20, wherein said user-specific information comprises a digital certificate and private key.

28. The system according to claim 20, further comprising an audit trail module for providing an audit trail of the signing of the document in said document as signed.

29. The system according to claim 28, wherein said audit trail includes a secure document authentication code uniquely representing said document as signed.

30. The system according to claim 29, wherein the document authentication code is a hash of said document as signed.

31. The system according to claim 20, wherein the document approval module comprises means for embedding a document authentication code uniquely representing the document as signed inside said document.

32. The system according to claim 20, wherein said document distribution module comprises means for transmitting a copy of the document as signed to the user.

33. The system according to claim 20, wherein said document distribution module provides a copy of the document as signed to at least one additional party concerned by said electronic document.

* * * * *